(12) United States Patent
Brown et al.

(10) Patent No.: US 7,472,037 B2
(45) Date of Patent: *Dec. 30, 2008

(54) SYSTEM AND METHODS FOR QUANTITATIVELY EVALUATING COMPLEXITY OF COMPUTING SYSTEM CONFIGURATION

(75) Inventors: Aaron B. Brown, Croton on Hudson, NY (US); Joseph L. Hellerstein, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 11/495,336

(22) Filed: Jul. 28, 2006

(65) Prior Publication Data

US 2007/0043525 A1 Feb. 22, 2007

Related U.S. Application Data

(62) Division of application No. 11/205,972, filed on Aug. 17, 2005, now Pat. No. 7,177,774.

(51) Int. Cl.
*G06F 15/00* (2006.01)

(52) U.S. Cl. .................................. 702/182; 702/81
(58) Field of Classification Search .................. 702/81, 702/182
See application file for complete search history.

(56) References Cited

U.S. PATENT DOCUMENTS

| | | | | |
|---|---|---|---|---|
| 5,745,880 | A * | 4/1998 | Strothmann | 705/7 |
| 5,793,632 | A * | 8/1998 | Fad et al. | 705/400 |
| 5,907,488 | A * | 5/1999 | Arimoto et al. | 700/97 |
| 5,960,417 | A * | 9/1999 | Pan et al. | 705/400 |
| 6,263,020 | B1 * | 7/2001 | Gardos et al. | 375/240.03 |
| 6,651,244 | B1 * | 11/2003 | Smith et al. | 717/154 |
| 6,715,130 | B1 * | 3/2004 | Eiche et al. | 715/210 |
| 6,922,684 | B1 * | 7/2005 | Aldridge et al. | 706/60 |
| 2007/0282644 | A1 * | 12/2007 | Diao et al. | 705/7 |

OTHER PUBLICATIONS

A.B. Brown et al., "Experience with Evaluating Human-Assisted Recovery Processes," Proceedings of the International Conference on Dependable Systems and Networks, Los Alamitos, CA, IEEE, 6 pp, Jun.-Jul. 2004.*

(Continued)

*Primary Examiner*—Edward Cosimano
*Assistant Examiner*—Douglas N Washburn
(74) *Attorney, Agent, or Firm*—Ryan, Mason & Lewis, LLP

(57) ABSTRACT

A technique for quantitatively evaluating a complexity associated with a configuration of a system under evaluation comprises the following steps/operations. Configuration-related data for the system under evaluation is collected. At least a portion of the configuration-related data is quantitatively analyzed using a model of human configuration cost to estimate a configuration complexity of the system under evaluation. A quality of the configuration of the system under evaluation is assessed. The configuration complexity of the system under evaluation is reported based on the quantitative analysis and the quality assessment. The step/operation of reporting the configuration complexity of the system under evaluation further comprises producing a report via an algorithm that computes a financial impact of a specified configuration process. The technique is useable to optimize a financial cost of providing one or more hosting services by selecting one or more system configurations that minimize a configuration cost.

13 Claims, 6 Drawing Sheets

OTHER PUBLICATIONS

Brown, A; Keller, A; Hellerstein, J; "A Model of Configuration Complexity and its Application to a Change Management System"; IFIP/IEEE International Conference on Integrated Network Management; May 15-19, 2005; pp. 631-644).*

Brown, AB; "Experience With Evaluating Human-Assisted Recovery Processes"; Proceedings of the InternationalConference on Dependable Systems and Networks; IEEE Jun. Jul. 2004; 6 pages.*

Brown, A; Hellerstein, J;"a model of configuration complexity and its application to a change management system";IFIP/IEEE International Conference on Integrated Network Management; May 15-19, 2005; pp. 631-644.*

Brown, A; Keller, A; Hellerstein, J; "A Model of Configuration Complexity and its Application to a Change Management System"; IFIP/IEEE International Conference on Integrated Network Management; May 15-19, 2005; pp. 631-644).*

A.B. Brown et al., "Experience with Evaluating Human-Assisted Recovery Processes," Proceedings of the International Conference on Dependable Systems and Networks, Los Alamitos, CA, IEEE, 6 pages, Jun.-Jul. 2004.

* cited by examiner

SYSTEM AND METHODS FOR QUANTITATIVELY EVALUATING COMPLEXITY OF COMPUTING SYSTEM CONFIGURATION

CROSS REFERENCE TO RELATED APPLICATION

This application is a divisional of U.S. application Ser. No. 11/205,972, filed Aug. 17, 2005, now U.S. Pat. No. 7,177,774 the disclosure of which is incorporated by reference herein.

FIELD OF THE INVENTION

The present invention relates to computing systems and, more particularly, to techniques for quantitatively evaluating the complexity of configuring such computing systems.

BACKGROUND OF THE INVENTION

The complexity of configuring computing systems represents a major impediment to efficient, error-free, and cost-effective deployment and management of computing systems of all scales, from handheld devices to desktop personal computers to small-business servers to enterprise-scale and global-scale information technology (IT) backbones. By way of example, configuring a computing system may encompass any process via which any of the system's structure, component inventory, topology, or operational parameters are persistently modified by a human operator or system administrator.

A computing system with a high degree of configuration complexity demands human resources to manage that complexity, increasing the total cost of ownership of the computing system. Likewise, complexity increases the amount of time that must be spent interacting with a computing system to configure it to perform the desired function, again consuming human resources and decreasing efficiency and agility. Finally, configuration complexity results in configuration errors, as complexity challenges human reasoning and results in erroneous decisions even by skilled operators.

Since the burdens of configuration complexity are so high, it is evident that computing system designers, architects, and implementers will seek to reduce configuration complexity, and likewise the purchasers, users, and managers of computing systems will seek to assemble systems with minimal configuration complexity. In order to do so, they must be able to quantitatively evaluate the degree of configuration complexity exposed by a particular computing system, i.e., designers, architects, and developers can evaluate the systems they build and optimize them for reduced complexity; purchasers, users, and managers can evaluate prospective purchases for complexity before investing in them. Furthermore, quantitative evaluation of configuration complexity can help computing service providers and outsourcers quantify the amount of human management that will be needed to provide a given service, allowing them to more effectively evaluate costs and set price points.

All these scenarios require standardized, representative, accurate, easily-compared quantitative assessments of configuration complexity, and motivate the need for a system and methods for quantitatively evaluating the configuration complexity of an arbitrary computing system.

The prior art of computing system evaluation includes no system or methods for quantitatively evaluating the configuration complexity of an arbitrary computing system. Well-studied computing system evaluation areas include system performance analysis, software complexity analysis, human-computer interaction analysis, and dependability evaluation.

System performance analysis attempts to compute quantitative measures of the performance of a computer system, considering both hardware and software components. This is a well-established area rich in analysis techniques and systems. However, none of these methodologies and systems for system performance analysis consider configuration-related aspects of the system under evaluation, nor do they collect or analyze configuration-related data. Therefore, system performance analysis provides no insight into the configuration complexity of the computing system being evaluated.

Software complexity analysis attempts to compute quantitative measures of the complexity of a piece of software code, considering both the intrinsic complexity of the code, as well as the complexity of creating and maintaining the code. However, processes for software complexity analysis do not collect configuration-related statistics or data and therefore provides no insight into the configuration complexity of the computing system running the analyzed software.

Human-computer interaction (HCI) analysis attempts to identify interaction problems between human users and computer systems, typically focusing on identifying confusing, error-prone, or inefficient interaction patterns. However, HCI analysis focuses on detecting problems in human-computer interaction rather than performing an objective, quantitative complexity analysis of that interaction. HCI analysis methods are not designed specifically for measuring configuration complexity, and typically do not operate on configuration-related data. In particular, HCI analysis collects human performance data from observations of many human users, and thus does not collect configuration-related data directly from a system under test.

Additionally, HCI analysis typically produces qualitative results suggesting areas for improvement of a particular user interface or interaction pattern and, thus, do not produce quantitative results that evaluate an overall configuration complexity of a system, independent of the particular user interface experience. The Model Human Processor approach to HCI analysis does provide objective, quantitative results; however, these results quantify interaction time for motor-function tasks like moving a mouse or clicking an on-screen button, and thus do not provide insight into computer system configuration complexity.

Finally, human-aware dependability evaluation combines aspects of objective, reproducible performance benchmarking with HCI analysis techniques with a focus on configuration-related problems, see, e.g., Brown et al., "Experience with Evaluating Human-Assisted Recovery Processes," Proceedings of the 2004 International Conference on Dependable Systems and Networks, Los Alamitos, Calif., IEEE, 2004. This approach included a system for measuring configuration quality as performed by human users, but did not measure configuration complexity and did not provide reproducibility or objective measures.

SUMMARY OF THE INVENTION

The present invention provides techniques for quantitatively evaluating the complexity of configuring computing systems.

By way of example, in one aspect of the invention, a technique for quantitatively evaluating a complexity associated with a configuration of a system under evaluation comprises the following steps/operations. Configuration-related data for the system under evaluation is collected. At least a portion of the configuration-related data is quantitatively analyzed using a model of human configuration cost to estimate a configuration complexity of the system under evaluation. A quality of the configuration of the system under evaluation is assessed. The configuration complexity of the system under evaluation is reported based on the quantitative analysis and the quality assessment. The step/operation of reporting the configuration complexity of the system under evaluation further comprises producing a report via an algorithm that computes a financial impact of a specified configuration process. The technique is useable to optimize a financial cost of providing one or more hosting services by selecting one or more system configurations that minimize a configuration cost.

The step/operation of collecting configuration-related data for the system under evaluation may further comprise capturing one or more configuration processes. This may comprise one or more of: monitoring a behavior of one or more human operators; analyzing documentation or a script; allowing direct manual entry of a configuration process; and loading one or more explicit specifications of a configuration process. Further, the step/operation of collecting configuration-related data for the system under evaluation may further comprise gathering data on one or more configuration controls. This may comprise gathering data comprising one or more of parameters, executable operations, status displays, and configuration repositories.

The step/operation of quantitatively analyzing at least a portion of the configuration-related data to estimate the configuration complexity of the system under evaluation may further comprise computing one or more configuration complexity scores. The one or more configuration complexity scores may comprise one or more of a human completion time score, an error rate score, an error severity score for a specified number of human operators with specified skill levels, and a raw complexity score based on statistical summarization of the collected configuration-related data. Further, the step/operation of quantitatively analyzing at least a portion of the configuration-related data to estimate the configuration complexity of the system under evaluation may further comprise using a model of human configuration cost.

The step/operation of reporting the configuration complexity of the system under evaluation further may comprise reporting results of the complexity analysis in one or more of a human-readable format and a machine-readable format. Further, the step/operation of reporting the configuration complexity of the system under evaluation may further comprise producing a report via an algorithm that computes a financial impact of a specified configuration process.

Advantageously, the steps/operation of the invention may be useable to dynamically adapt one or more configuration interfaces to minimize configuration complexity. They may also be useable to optimize a financial cost of providing one or more hosting services by selecting one or more system configurations that minimize a configuration cost.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
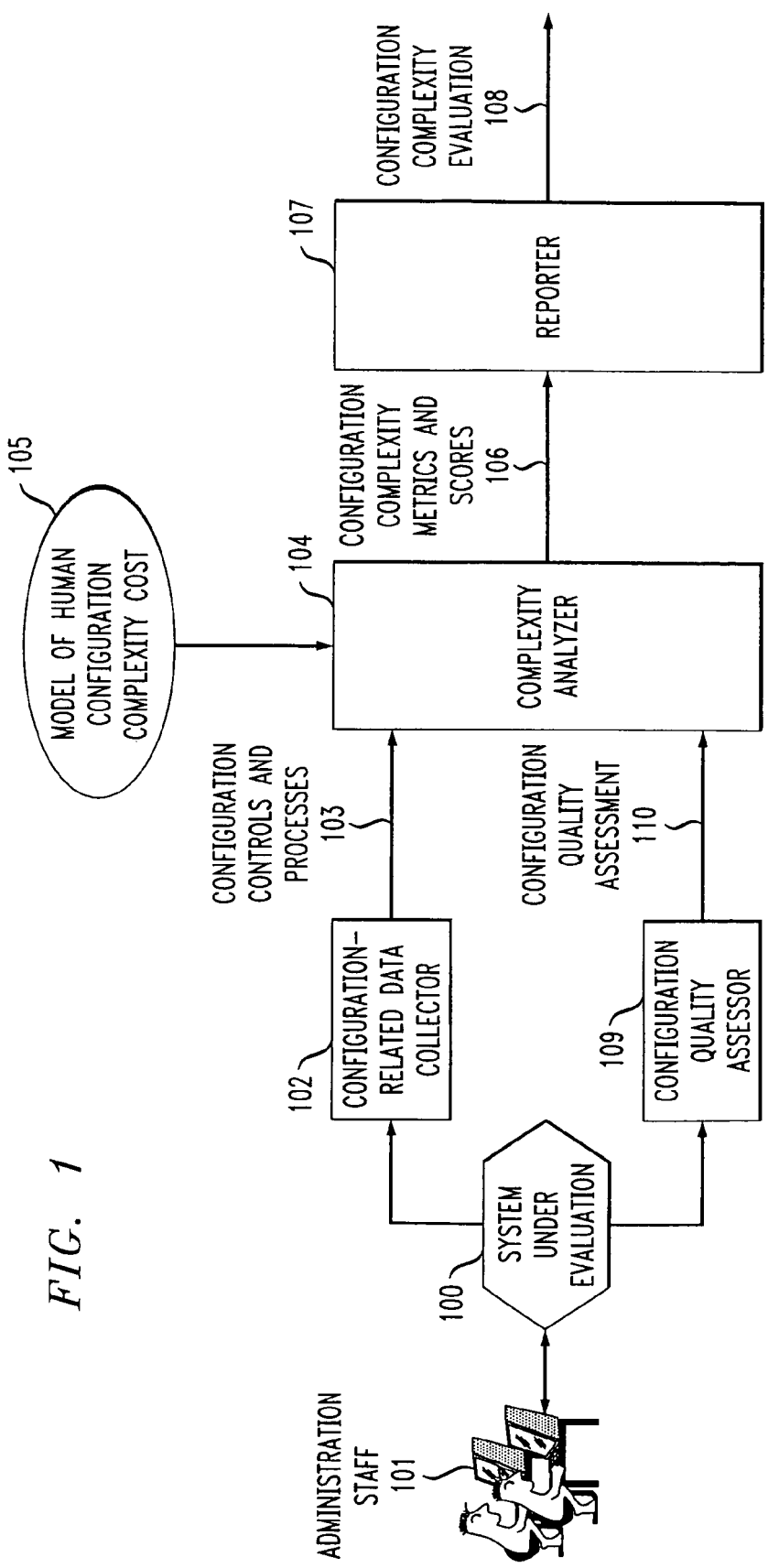
FIG. 1 is a block diagram illustrating a configuration complexity evaluation system and its associated environment, according to an embodiment of the invention.

As will be illustratively described below, principles of the present invention provide techniques for quantitatively evaluating the complexity of configuring computing systems such as centralized, distributed, and embedded computing systems. By way of example, configuring a computing system may encompass any process via which any of the system's structure, component inventory, topology, or operational parameters are persistently modified by a human operator or system administrator. Examples include, but are not limited to, installing, provisioning, upgrading, or decommissioning software or hardware; adjusting settings on two or more systems so that they are able to communicate with each other; adjusting system parameters to alter system performance or availability; and repairing damage to a system's state resulting from a security incident or component failure.

Configuration complexity refers to the degree of simplicity or difficulty perceived by human operators, system administrators, or users who attempt to perform configuration tasks on a computing system. Quantification of a computer system's configuration complexity is useful across a broad set of computing-related disciplines including, but not limited to, computing system architecture, design, and implementation; implementation of automated system management; packaging and pricing of computing-related services such as outsourcing services; product selection; sales and marketing; and development of system operations/administration training programs.

Principles of the present invention provide a system and methods for producing a standard, reproducible evaluation of the configuration complexity of a computer system. Note that we illustratively define a system's configuration as all state, parameter settings, options, and controls that affect the behavior, functionality, performance, and non-functional attributes of a computing system. We also illustratively define configuration complexity as the degree of simplicity or difficulty perceived by human operators, system administrators, users, or automated tools that attempt to alter a computing system's configuration to achieve specific configuration goals.

Furthermore, principles of the present invention address the problem of objectively, reproducibly quantifying configuration complexity of computing systems, which has not been done previously in the domain of distributed and enterprise computing systems. In accordance with illustrative embodiments, a system and methods are provided for solving the above problem based on a benchmarking perspective, which provides quantitative, reproducible, objective results that can be compared across systems, all at a low operational cost. We propose illustrative methods for collecting configuration-related data from a computing system that enable the quantification of configuration complexity in an objective, reproducible, low cost manner.

As will be further described below in detail, an illustrative architecture of the invention includes a configuration data collector, a configuration quality assessor, a complexity analyzer, and a reporter, each corresponding to a phase in the overall process of quantifying a computer system's configuration complexity. It is to be understood that while each of these phases are described below as discrete phases, the various phases can potentially overlap (e.g., a continuous system that collects new configuration-related data while analyzing older data).

In a first phase, the configuration data collector collects configuration-related data from the computing system. Configuration-related data provides information on the computer system's configuration, i.e., such data describes the system's current configuration, the options available for altering its configuration, the effects of those options on the system's configuration and behavior, and the procedures via which the system's configuration can be altered by a human operator or automated tool. In particular, configuration-related data may include traces of configuration procedures performed on the computing system by expert human administrators, and may also include data on the set of human-visible configuration controls, their possible values, and the dependencies between different controls.

Next, in a second phase of the configuration complexity quantification process, the configuration quality assessor analyzes the computing system under evaluation to determine the quality of its configuration. During this phase, the system under evaluation is presumed to be in the desired configuration. In particular, if the collected configuration-related data includes traces of configuration procedures, these procedures should have already been performed on the system under evaluation. Configuration quality is measured in whatever metrics are needed to assess how well the configuration of the system under evaluation meets the configuration goals set out for it. Typically, configuration quality will be assessed in terms of the functionality, performance, correctness, availability, and quality of service provided by the system under evaluation.

The results from the configuration data collector and configuration quality assessor feed into a third component of the system, i.e., a complexity analyzer. This component analyzes the supplied configuration-related data and quality assessments and computes one or more configuration complexity scores. Configuration complexity scores are numerical results that quantify aspects of externally-perceived configuration complexity, including but not limited to: (i) the amount of time and effort that must be expended to achieve a configuration goal; (ii) the level of skill required to achieve such a goal without error (or conversely the likely error rate at a given insufficient skill level); (iii) the likelihood that a configuration error will cause damage to the system, and the severity of that damage; (iv) the amount of external information that must be brought to bear to achieve a configuration goal and the difficulty of obtaining that information; (v) the demands on various cognitive capabilities of a human operator performing a configuration task, such as memory; and (vi) the degree of interdependency between configuration-related data or procedures.

Such illustrative configuration complexity scores are quantitative; they are reproducible given the same input data; and they are objective, based solely on input data plus pre-defined complexity algorithms and models.

Finally, a last phase in the configuration complexity evaluation process involves the reporter component of the system. This component takes the complexity scores produced by the complexity analyzer and produces reports usable by human system administrators and other people affected by configuration complexity as well as machine-readable reports usable, for example, by tools that attempt to optimize configurations automatically to reduce complexity. The reporter component may apply models that map complexity scores to higher-level metrics, such as business cost estimates, and may use user-supplied parameterizations to assign appropriate weights to complexity scores when reporting them directly or aggregating them into reports.

Principles of the present invention are applicable in many different use cases, by way of example only:

(1) For making purchase decisions concerning computing/IT technology. A quantitative configuration complexity evaluation provides a means for choosing between different competing products based on their configuration complexity, which is a factor affecting total cost of ownership of the product. With an appropriately-constructed reporter component, principles of the present invention can provide quantification of the cost differential between two competing products resulting from their configuration complexity.

(2) For use by service providers in setting prices for services. A quantitative configuration complexity evaluation of an IT system can predict the amount of human management required as well as the needed skill level of system administrators. With this information, a service provider can compute the cost of providing a service based on a complexity evaluation, even before the service is deployed in production use. This provides valuable input into setting prices for service offerings.

(3) For use by outsourcing providers in computing costs. An outsourcing provider that intends to take over operation of a customer's IT environment can perform a quantitative complexity evaluation on that environment using principles of the present invention. The reported results of that evaluation can be used to more accurately estimate the human management costs of that infrastructure than existing methods. This allows the outsourcing provider to more accurately bid on the outsourcing engagement and to more efficiently allocate resources to running the customer's environment.

(4) For use by system architects and developers. Computer system architects and developers can use quantitative configuration complexity evaluations to help make and validate design decisions that potentially affect configuration complexity and management cost. For example, much as a developer might use a code profiler to identify performance bottlenecks, principles of the present invention could be used to identify complexity bottlenecks. Fixing these bottlenecks could then be used as a requirement on future development.

(5) For use by system managers. In addition to their role in making purchase decisions (see above), system managers/administrators often construct their own automation mechanisms to simplify configuration tasks. A quantitative configuration complexity evaluation of all the systems managed by an administrator would provide valuable insight into where to focus automation efforts and where to target training for non-automatable configuration problems.

Referring initially to FIG. 1, a block diagram illustrates a configuration complexity evaluation system and its associated environment, according to an embodiment of the invention.

As depicted, system under evaluation 100 represents the computing system whose configuration complexity is being assessed. The system under evaluation comprises the hardware components and software components that make up the computing system. The system under evaluation is configured and maintained by its human administration staff 101, comprising one or more human operators/administrators or users operating in an administrative capacity.

Configuration-related data collector 102 extracts configuration-related information comprising configuration controls and processes 103 from the system under evaluation and its interactions with its administration staff. In one embodiment of the invention, this data is collected by capturing configuration processes performed by the system under evaluation's administration staff, as described below in FIGS. 3 and 4.

The collected data is consumed by complexity analyzer 104, which derives a set of low-level configuration complexity measures through analysis of the configuration-related data. The complexity analyzer additionally uses a model of human configuration complexity cost 105 to map the low-level measures into a prediction of human-perceived configuration complexity and human configuration cost, represented as configuration complexity metrics and scores 106.

As part of its analysis, the complexity analyzer 104 may draw on a configuration quality assessment 110 produced by a configuration quality assessor 109, which measures the quality of the system under evaluation's configuration.

The metrics and scores produced by the complexity analyzer are consumed by the reporter 107, which merges and formats them into human-readable and/or machine-readable configuration complexity evaluations 108.

Figure 2:
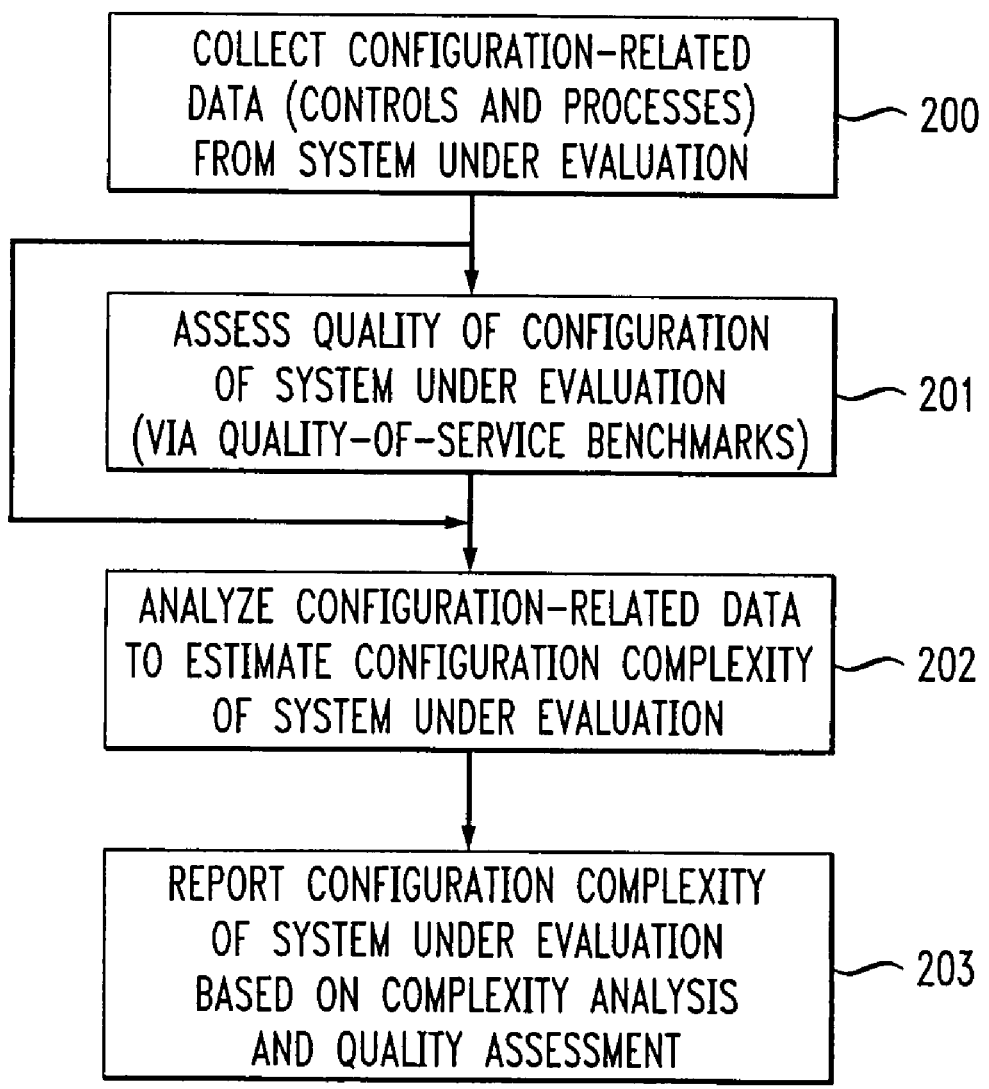
FIG. 2 is a flow diagram illustrating a configuration complexity evaluation methodology, according to an embodiment of the invention.

Referring now to FIG. 2, a flow diagram illustrates a configuration complexity evaluation methodology, according to an embodiment of the invention. More particularly, FIG. 2 illustrates a methodology that may be implemented by the evaluation system of FIG. 1.

As depicted, in step 200, configuration-related data comprising configuration processes and controls are collected from the system under evaluation, as described in detail below and in FIGS. 3 and 4. In step 201, the configuration of the system under evaluation may be assessed for quality. In one embodiment, this assessment may take the form of a quality-of-service benchmark test, such as a standard performance benchmark. It is to be appreciated that, as shown, the system can bypass step 201.

In step 202, the collected configuration-related data is analyzed as described below and in FIG. 5 to produce configuration complexity metrics and scores, which are then consumed by step 203, which produces human-readable and/or machine-readable reports on the configuration complexity of the system under evaluation.

Figure 3:
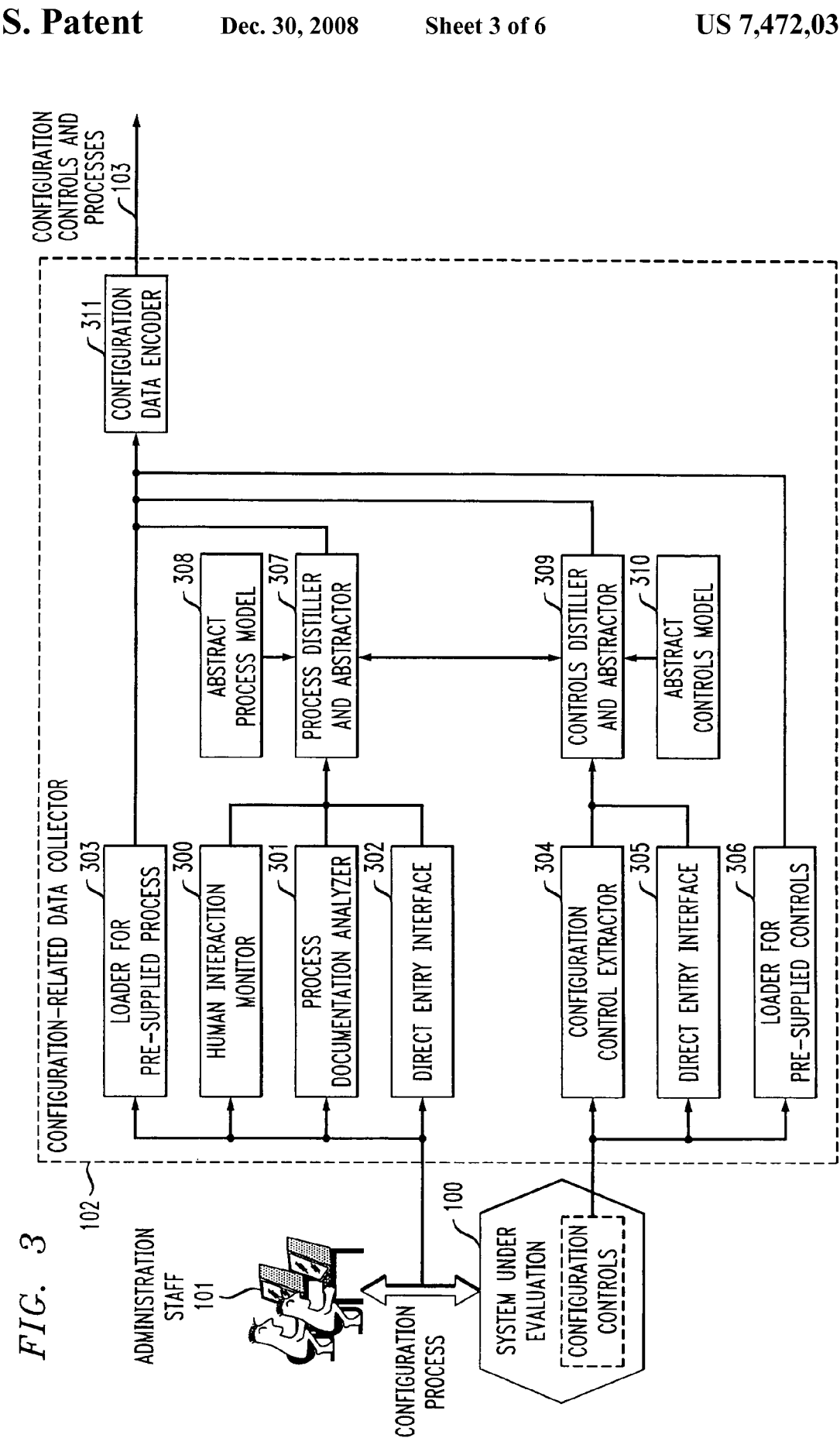
FIG. 3 is a block diagram illustrating a configuration-related data collector component, according to an embodiment of the invention.

Referring now to FIG. 3, a block diagram illustrates a configuration-related data collector component, according to an embodiment of the invention. More particularly, FIG. 3 depicts an example of configuration-related data collector 102.

As shown, the first set of components, 300 through 303, collect information on configuration processes that need to be performed on the system under evaluation. These processes are collected via four different components (any subset of which may be present in the configuration-related data collector component, of which any subset of those present may be involved in collecting any particular process).

One component is a human interaction monitor 300 that records the interactions between the system under evaluation and member(s) of its human administration staff as those staff members perform configuration processes. Such a monitor 300 might take the form of a video recording, a "screencam" capture of on-screen content, or an automated collection of interaction with the system's interfaces, amongst other possibilities.

Next is a process documentation analyzer 301 that extracts the steps, sequences, and parameters that make up a configuration process from a documented version of that procedure such as, but not limited to, human-readable documents like installation manuals and machine-readable documents like executable scripts.

Next is a direct entry interface 302 that allows a person to manually enter the steps, sequences, and parameters of a particular configuration process without having to perform it on the system under evaluation or represent it in documentation.

Last is a loader for pre-supplied processes 303 that allows for the possibility that a configuration process for the system under evaluation has already been documented in the appropriate machine-readable format and simply needs to be loaded into the collector 102.

The next set of components, 304 through 306, collect information on the configuration controls present in the system under evaluation. Configuration controls are the parameters, executable operations, status displays, and modifiable pieces of state that define and alter the system's configuration. Again, any subset of these components (304 through 306) may be present in the configuration-related data collector, and any subset of those present may be used in any given complexity analysis. The configuration control extractor 304 analyzes the interfaces of the system under evaluation to identify the set of available configuration controls. The direct entry interface 305 performs a similar function as component 302, allowing manual entry of information on configuration controls. Finally the loader for pre-supplied controls 306 is similar to component 303 and allows pre-defined, machine-readable representations of configuration controls to be loaded into the configuration-related data collector.

The process distiller and abstractor 307 takes the collected information from components 300 through 302. It combines the multiple sources of data together, and abstracts the resulting process by mapping elements specific to the system under evaluation to elements of a generic model of configuration processes 308. In one embodiment, the model is described by an Extensible Markup Language (XML) Schema that defines process elements and specifies how they can be put together.

The controls distiller and abstractor 309 performs the same function as the process distiller and abstractor, except that it processes configuration controls rather than configuration processes, using a generic model of configuration controls 310. Note that the controls distiller and abstractor and the process distiller and abstractor communicate, to allow for cases where the existence of controls is inferred during process distillation, and where controls identified during control distillation imply the existence of processes.

Finally, the configuration data encoder 311 takes the distilled and abstracted processes and controls and encodes them into a standard representation of configuration-related data. In one embodiment, this representation is captured in XML following an XML Schema based on the abstract controls and processes models. Note that the loaders for processes and controls (303 and 306) allow for the direct loading of pre-existing distilled and abstracted processes and controls, bypassing the distillers and abstractors.

Figure 4:
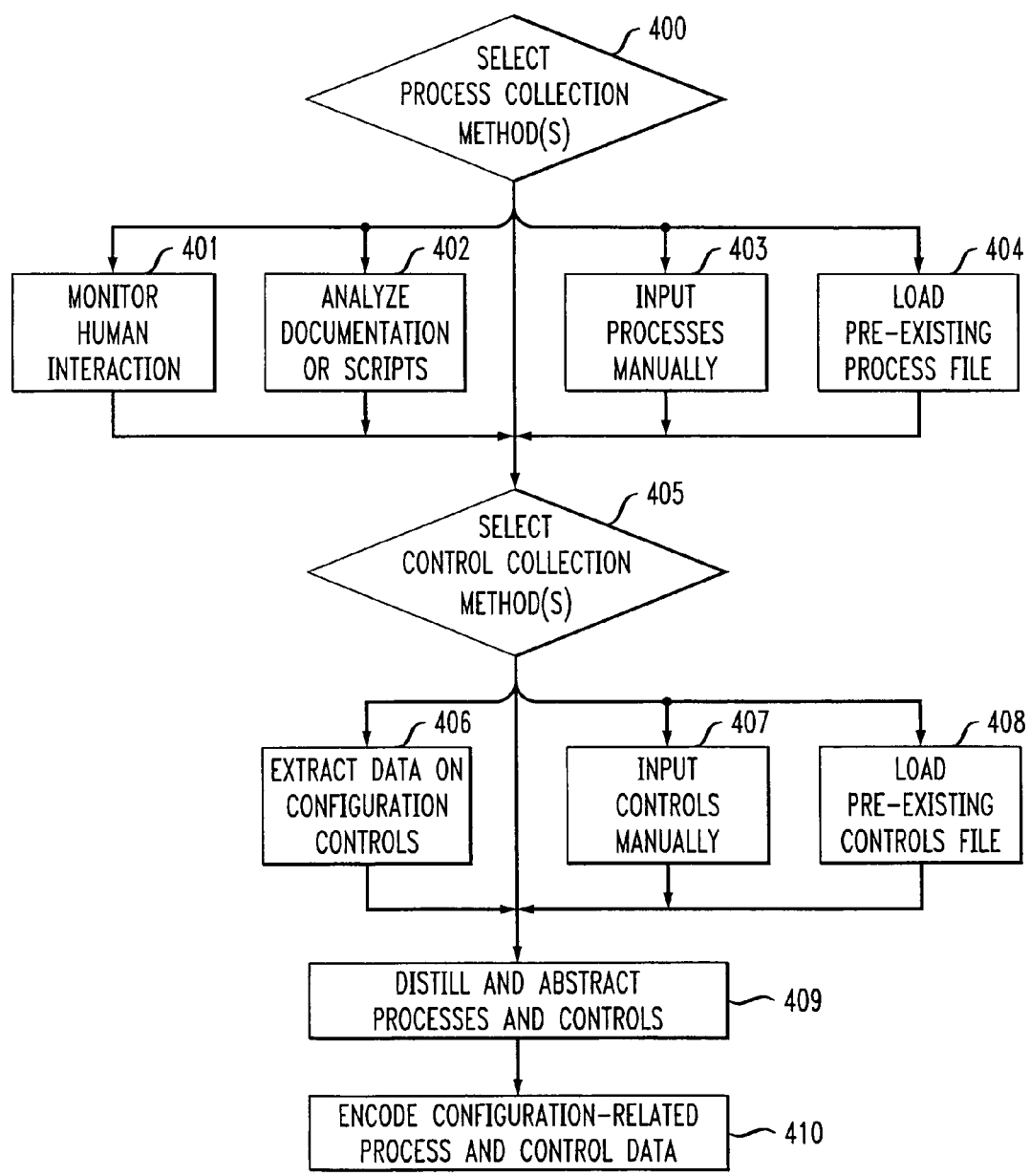
FIG. 4 is a flow diagram illustrating a configuration-related data collector methodology, according to an embodiment of the invention.

FIG. 4 depicts a process underlying the configuration-related data collector component in FIG. 3. The first step 400 is to select which method(s) will be used to collect data on configuration processes. Any subset of the methods in steps 401 through 404 can be used, or the process collection step can be omitted entirely. Of the four methods, the first method 401 collects data by monitoring human interaction between the system under evaluation's administration staff and the system itself, via the aforementioned human interaction monitor 300. The second method 402 collects configuration processes by analyzing documentation or scripts, via the process documentation analyzer 301. The third method 403 allows processes to be input manually by a human operator, using the direct entry interface 302. Finally, the fourth method 404 loads a pre-specified process directly using the loader for pre-supplied processes 303.

The next step in the configuration-related data collection process is to select which method(s), if any, will be used to collect data on configuration controls, from the submethods 406 through 408. One option 406 uses the configuration control extractor 304 to identify configuration controls. Another option 407 allows manual input of data on configuration controls via the direct entry interface 305. Finally, a pre-specified set of configuration control data can be loaded 408 via the loader for pre-supplied controls 306.

Once the configuration controls and processes are collected, the next step 409 is to distill and abstract the collected data using the controls distiller and abstractor 309, then to encode those results with the configuration data encoder 311.

Figure 5:
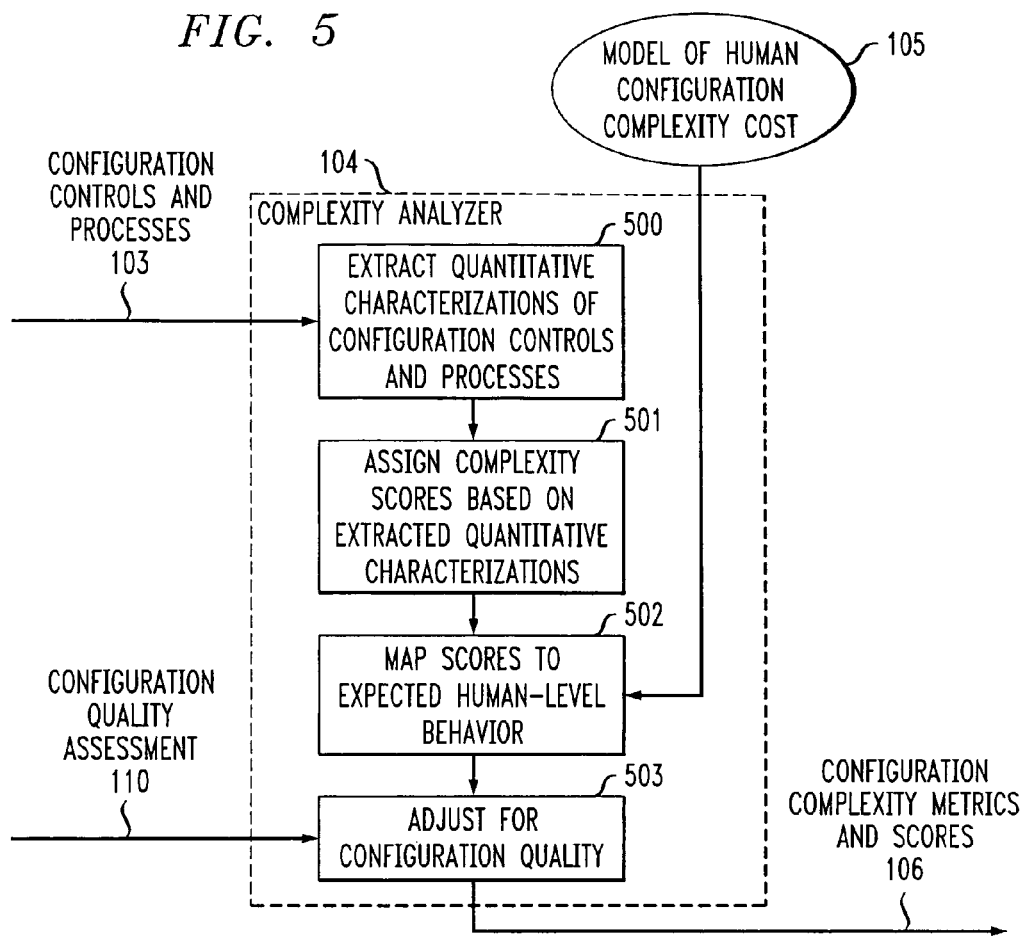
FIG. 5 is a block diagram illustrating a complexity analyzer component, according to an embodiment of the invention.

Referring now to FIG. 5, a block diagram illustrates a complexity analyzer component, according to an embodiment of the invention. More particularly, FIG. 5 depicts an example of complexity analyzer component 104. This component consumes the encoded configuration controls and processes 103 from the configuration-related data collector.

The complexity analyzer component first analyzes that information to extract quantitative characterizations of the configuration controls and processes (500). For example, the complexity analyzer might identify sequences and compute distributions of different types of configuration activities in the configuration processes, or compute the distribution of control types and complexity of control dependency graph, or might apply a simulation of aspects of human mental processing to compute the burden placed by a configuration process on a person's mental capacity.

Next, the complexity analyzer assigns complexity scores to the system under evaluation (501) based on the quantitative characterizations extracted in the previous step. This step can involve simple data reduction, e.g., by combining and weighting the quantitative characterizations, or may involve model-based approaches where complexity is predicted from the quantitative characterizations.

Next, if so desired, the complexity scores may be mapped to expected human-level behavior (502). This mapping may draw on the model of human configuration complexity cost 105, which models how the complexity scores produced in 501 affect human-perceived complexity attributes. Examples of these attributes include, but are not limited to, expected completion time, error rate, and error severity on typical configuration tasks, as well as the number and skill level of human administrators required to achieve those times and error rates.

Finally, if so desired, the complexity analysis results may be adjusted (503) based on the configuration quality assessment, if available. This adjustment may take the form of weighting the complexity analysis results by the measured quality of the system under evaluation's configuration. It may also simply be a gating function, where if the assessed quality is insufficient, the complexity analysis results are replaced by an indication that the system under evaluation has failed the configuration complexity evaluation.

Figure 6:
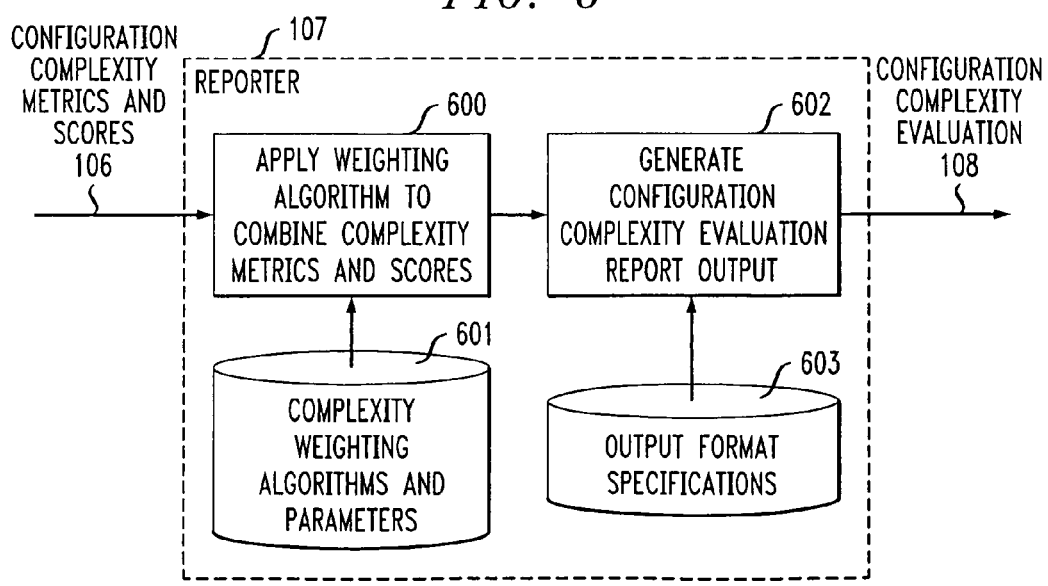
FIG. 6 is a block diagram illustrating a reporter component, according to an embodiment of the invention.

Referring now to FIG. 6, a block diagram illustrates a reporter component, according to an embodiment of the invention. More particularly, FIG. 6 depicts an example of reporter component 107.

The reporter component takes as input the results of the complexity analyzer component, represented as configuration complexity metrics and scores 106. The reporter performs two functions.

First, the reporter applies, combines and weights the various metrics and scores provided by the complexity analyzer (600). This step draws upon complexity weighting algorithms and parameters 601, which may be pre-defined, supplied by the users of the reporter tool, or developed automatically. As an example, one possible weighting algorithm is to assign a dollar-cost function to each type of metric and score produced by the complexity analyzer, based on parameters that specify the actual costs of human time and the expected dollar impact of configuration errors on the service provided by the system under evaluation. This algorithm produces an estimate of how configuration tasks on the system under evaluation affect its total cost of ownership.

The reporter's next step (602) is to generate configuration complexity evaluation reports using the data from the previous step and drawing on a library of output format specifications 603 to determine the format of the evaluation report. Possible output format specifications may include document structures and templates for human-readable evaluations of the system under evaluation, and structured machine-readable report schemas, e.g., represented as XML Schemas.

Figure 7:
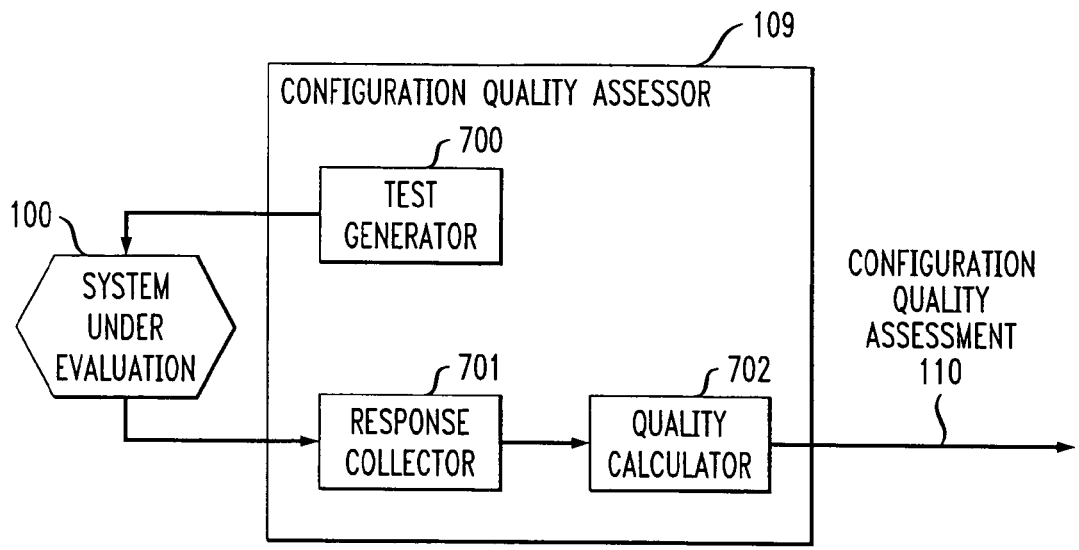
FIG. 7 is a block diagram illustrating a configuration quality assessor component, according to an embodiment of the invention.

Referring now to FIG. 7, a block diagram illustrates a configuration quality assessor component, according to an embodiment of the invention. More particularly, FIG. 7 depicts an example of configuration quality assessor 109. As shown, the configuration quality assessor includes three subcomponents: a test generator 700, a response collector 701, and a quality calculator 702.

Test generator 700 applies configuration quality tests to the system under evaluation. These may include simulated user transactions to check for quality aspects like functionality, correctness, and performance; complete simulated workloads to check for quality under load or stress; disturbances (such as faults, load spikes, simulated security incidents) to test quality under abnormal circumstances; and other quality-related tests. Response collector 701 collects the system under evaluation's responses to the applied quality tests. Quality calculator 702 computes the configuration quality of the system under evaluation based on the responses to the applied quality tests. The quality calculator produces a configuration quality assessment 110, which is later consumed by the complexity analyzer 104.

Figure 8:
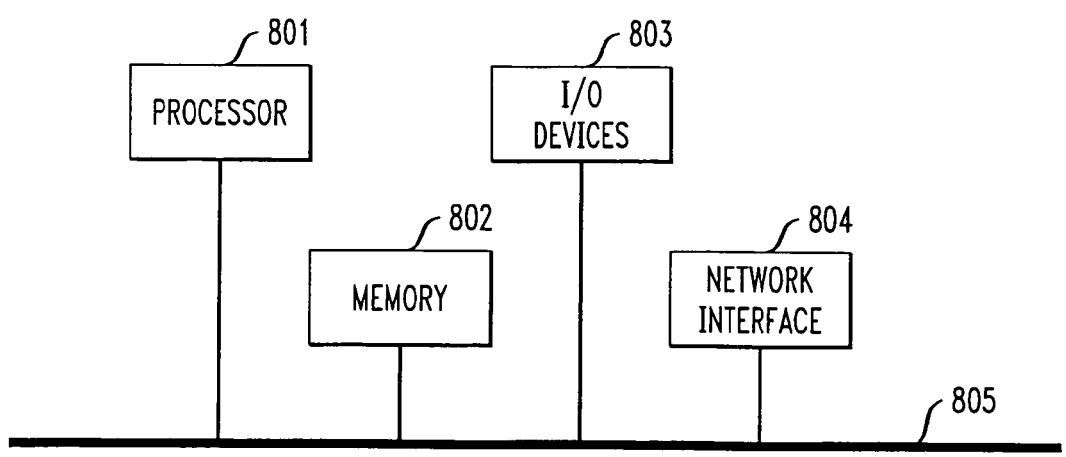
FIG. 8 is a block diagram illustrating a computer system for implementing a configuration complexity evaluation system, according to an embodiment of the invention.

Referring finally to FIG. 8, a block diagram illustrates a computer system for implementing a configuration complexity evaluation system, according to an embodiment of the invention. That is, FIG. 8 depicts an illustrative implementation of a computer system in accordance with which one or more components/methodologies of a configuration complexity evaluation system (e.g., components/methodologies described in the context of FIGS. 1 through 7) may be implemented. For instance, the computer system in FIG. 8 may implement the components associated with the configuration complexity evaluation system of FIG. 1 and implement the methodologies described herein. Also, the computer system in FIG. 8 may represent an implementation of the system under evaluation 100 of FIG. 1. Still further, the computer system of FIG. 8 may represent implementations of computers used by one or more individuals associated with the environment of FIG. 1, e.g., administration staff, users, etc.

It is to be understood that such individual components/methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, the computer system may be implemented in accordance with a processor 801, a memory 802, I/O devices 803, and a network interface 804, coupled via a computer bus 805 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, random access memory (RAM), read only memory (ROM), a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., read only memory, fixed or removable memory) and, when ready to be utilized, loaded in part or in whole (e.g., into random access memory) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as illustratively explained above, embodiments of the invention provide a system and methods for a standard, reproducible evaluation of the configuration complexity of a computer system. The methods may advantageously include techniques for collection of configuration-related data from a computing system, analysis of configuration-related data to calculate complexity of configuration processes, and reporting of computer system configuration complexity. The system may advantageously include a configuration data collector, complexity analyzer, configuration quality assessor, and reporter. The data collector may gather configuration information from traces of actual configuration processes or from the set of exposed configuration controls on a computing system. The quality assessor may evaluate the quality of a particular computer system configuration, for example, in terms of the quality-of-service that it delivers to its users. The configuration complexity analyzer may use the collected configuration data and quality assessment to compute quantitative measures of low-level aspects of configuration complexity as well as high-level predictions of human-perceived complexity. Finally, the reporter may produce human-readable and machine-readable evaluation reports of a computing system's configuration complexity, based on the results of the configuration complexity analysis.

Furthermore, while the illustrative embodiments above describe performance of steps/operations of the invention being performed in an automated manner, the invention is not so limited. That is, by way of further example, collecting configuration-related data, analyzing configuration-related data, and reporting complexity may be performed entirely manually, or with a mix of manual activities, automation, and computer-based tools (such as using spreadsheets for the analysis or manually collecting configuration data and feeding it to an automated complexity analyzer).

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for quantitatively evaluating a complexity associated with a configuration of a system under evaluation, comprising the steps of:

collecting configuration-related data for the system under evaluation;

quantitatively analyzing at least a portion of the configuration-related data using a model of human configuration cost to estimate a configuration complexity of the system under evaluation;

assessing a quality of the configuration of the system under evaluation; and reporting the configuration complexity of the system under evaluation based on the quantitative analysis and the quality assessment;

wherein the step of reporting the configuration complexity of the system under evaluation further comprises producing a report via an algorithm that computes a financial impact of a specified configuration process; and wherein the method is useable to optimize a financial cost of providing one or more hosting services by selecting one or more system configurations that minimize a configuration cost.

2. The method of claim 1, wherein the step of collecting configuration-related data for the system under evaluation further comprises capturing one or more configuration processes.

3. The method of claim 2, wherein the step of capturing one or more configuration processes further comprises one or more of:

monitoring a behavior of one or more human operators;

analyzing documentation or a script;

allowing direct manual entry of a configuration process; and loading one or more explicit specifications of a configuration process.

4. The method of claim 1, wherein the step of collecting configuration-related data for the system under evaluation further comprises gathering data on one or more configuration controls.

5. The method of claim 4, wherein the step of gathering data on one or more configuration controls further comprises gathering data comprising one or more of parameters, executable operations, status displays, and configuration repositories.

6. The method of claim 1, wherein the step of quantitatively analyzing at least a portion of the configuration-related data to estimate the configuration complexity of the system under evaluation further comprises computing one or more configuration complexity scores.

7. The method of claim 1, wherein the step of reporting the configuration complexity of the system under evaluation further comprises reporting results of the complexity analysis in one or more of a human-readable format and a machine-readable format.

8. The method of claim 1, wherein the method is useable to dynamically adapt one or more configuration interfaces to minimize configuration complexity.

9. Apparatus for quantitatively evaluating a complexity associated with a configuration of a system under evaluation, comprising:
   a memory; and
   at least one processor coupled to the memory and operative to: (i) collect configuration-related data for the system under evaluation; (ii) quantitatively analyze at least a portion of the configuration-related data using a model of human configuration cost to estimate a configuration complexity of the system under evaluation; (iii) assess a quality of the configuration of the system under evaluation; and (iv) report the configuration complexity of the system under evaluation based on the quantitative analysis and the quality assessment;
   wherein the operation of reporting the configuration complexity of the system under evaluation further comprises producing a report via an algorithm that computes a financial impact of a specified configuration process; and
   wherein the operations performed by the apparatus are useable to optimize a financial cost of providing one or more hosting services by selecting one or more system configurations that minimize a configuration cost.

10. The apparatus of claim 9, wherein the operation of collecting configuration-related data for the system under evaluation further comprises capturing one or more configuration processes.

11. The apparatus of claim 9, wherein the operation of collecting configuration-related data for the system under evaluation further comprises gathering data on one or more configuration controls.

12. The apparatus of claim 11, wherein the operation of gathering data on one or more configuration controls further comprises gathering data comprising one or more of parameters, executable operations, status displays, and configuration repositories.

13. The apparatus of claim 9, wherein the operation of reporting the configuration complexity of the system under evaluation further comprises reporting results of the complexity analysis in one or more of a human-readable format and a machine-readable format.

* * * * *